Dec. 16, 1947.  S. H. DORSEY ET AL  2,432,609
HYDROPNEUMATIC PRESSURE SYSTEM
Filed Oct. 7, 1944  2 Sheets-Sheet 1
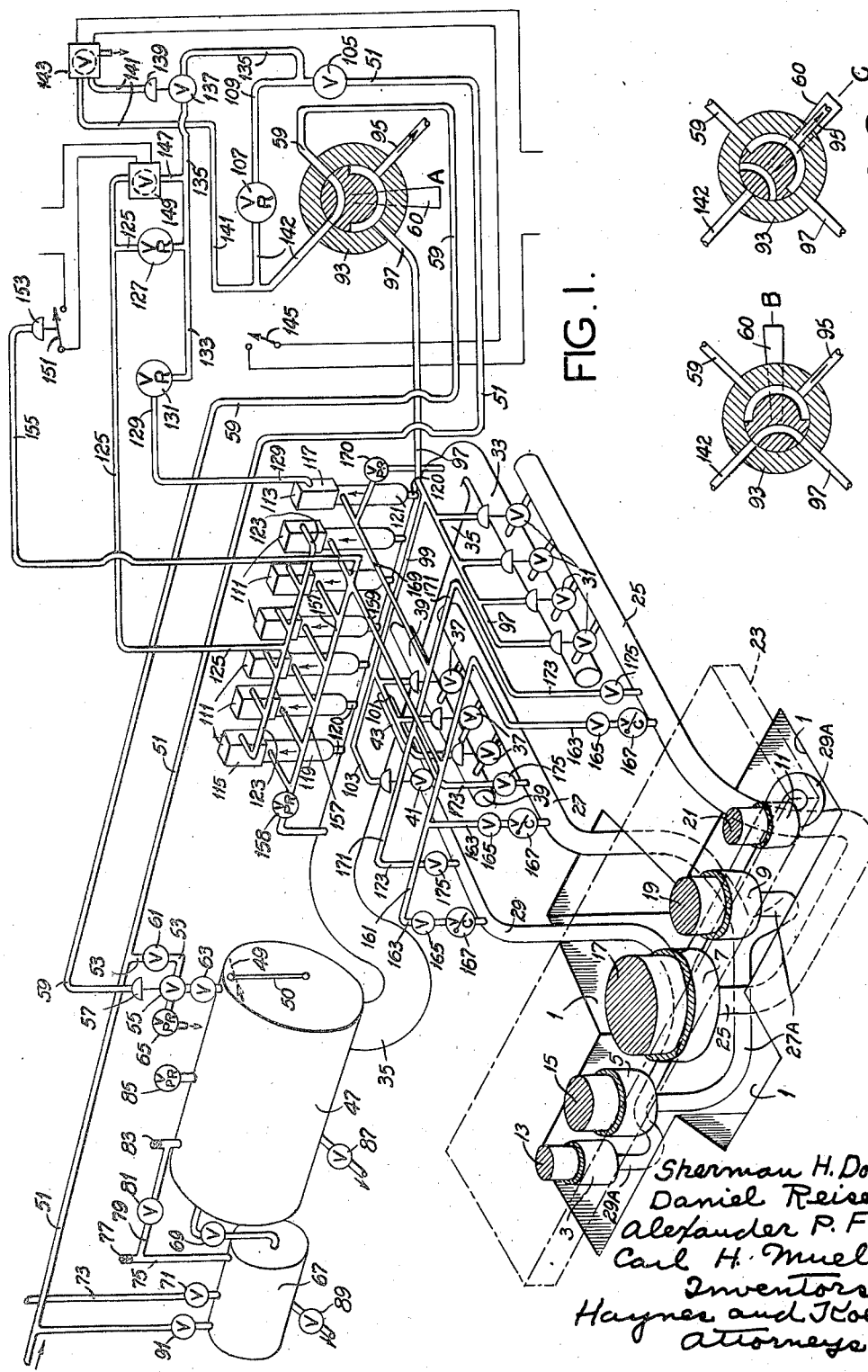

Dec. 16, 1947.    S. H. DORSEY ET AL    2,432,609
HYDROPNEUMATIC PRESSURE SYSTEM
Filed Oct. 7, 1944    2 Sheets-Sheet 2

| EVENT NO. | OPERATIONS | HANDLE OF VALVE 93 | SWITCH 145 | TANK INLET VALVE 55 | VALVES 31-37 AND 41 | VALVE 143 ACTUATED BY SWITCH 145 | VALVE 137 ACTUATED BY VALVE 143 | PRESSURE SWITCH 151* | SOLENOID AIR VALVE 149** |
|---|---|---|---|---|---|---|---|---|---|
| 1 | IDLE, PLATEN DOWN | C | OPEN | CLOSED AND VENTED | OPEN | CLOSED | CLOSED | OPEN | OPEN |
| 2 | RAISE PLATEN- DAYLIGHT CLOSING LOW PRESSURE | A | OPEN | OPEN | OPEN | CLOSED | CLOSED | OPEN | OPEN |
| 3 | MANUAL STOP ANYWHERE DURING DAYLIGHT CLOSING | B | OPEN | CLOSED AND VENTED | CLOSED | CLOSED | CLOSED | OPEN | OPEN- |
| 4 | RAISE PLATEN- DAYLIGHT CLOSING LOW PRESSURE WITH AUTOMATIC STOP | A | OPEN | OPEN | OPEN | CLOSED | CLOSED | OPEN | OPEN |
| 5 | RAISE PLATEN, SQUEEZE DIES WITH BOOSTED PRESSURE | B | CLOSED | CLOSED AND VENTED | CLOSED | OPEN | OPEN | OPEN | OPEN |
| 5A | PLATEN AUTOMATICALLY ENDS TRAVEL | B | CLOSED | CLOSED AND VENTED | CLOSED | OPEN | OPEN | CLOSED | CLOSED |
| 6 | MANUAL STOP ANYWHERE DURING EVENT NO.5 AND BEFORE EVENT NO.5A. | B | OPEN | CLOSED AND VENTED | CLOSED | CLOSED | CLOSED | OPEN | OPEN |
| 7 | LOWER PLATEN | C | OPEN | CLOSED AND VENTED | OPEN | CLOSED | CLOSED | OPEN | OPEN |
| 8 | RAISE PLATEN, SQUEEZE DIES WITH INTENSIFIED PRESSURE | B | CLOSED | CLOSED AND VENTED | CLOSED | OPEN | OPEN | OPEN | OPEN |
| 8A | PLATEN AUTOMATICALLY ENDS TRAVEL | B | CLOSED | CLOSED AND VENTED | CLOSED | OPEN | OPEN | CLOSED | CLOSED |

FIG.4.
CHART OF OPERATIONS

\* ACTUATED BY FLUID PRESSURE

\*\* ACTUATED BY PRESSURE SWITCH 151

Sherman H. Dorsey,
Daniel Reisert,
Alexander P. Fox,
Carl H. Mueller,
    Inventors.
Haynes and Koenig,
    Attorneys.

Patented Dec. 16, 1947

2,432,609

UNITED STATES PATENT OFFICE 2,432,609

HYDROPNEUMATIC PRESSURE SYSTEM

Sherman H. Dorsey, Webster Groves, August D. Reisert, St. Louis, Alexander P. Fox, University City, and Carl H. Mueller, Ferguson, Mo., assignors to Lincoln Engineering Company, St. Louis, Mo., a corporation of Missouri Application October 7, 1944, Serial No. 557,674

8 Claims. (Cl. 60—97)

1

This invention relates to hydro-pneumatic apparatus and pressure systems, and with regard to certain more specific features to apparatus and systems of this class for operating hydraulic presses and the like.

Among the several objects of the invention may be noted the provision of an economical and reliable hydro-pneumatic pressure system and apparatus for operating hydraulic presses and the like, particularly those with large platens which for proper alignment require several lifting rams; the provision of a system of the class described which, by means of relatively simple control elements, permits of much flexibility of control and wide adaptability of the press to full or partial use of its platen area; the provision of a system of the class described which permits of localized application of pressure at desired regions on large press platens for maintaining accurate platen alignment and accurate application of pressures to the object being pressed; the provision of a system of the class described which shortens the so-called daylight closing period and also a boosted compression period of the press, until a predetermined compression pressure is reached, after which a predetermined final intensified pressure at small displacement is automatically effected; the provision of apparatus of this class in which application and release of pressure and also retraction may be effected at will in any part of the operating cycle; the provision of apparatus of this class which may readily be set up to function by routine for any of a large variety of desired conditions of operation; and the provision of apparatus of this class which may be easily installed, maintained and repaired. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a diagrammatic layout of the system;

Figs. 2 and 3 show alternate positions of a control valve; and,

Fig. 4 is a chart of operating conditions for various events.

Similar reference characters indicate corresponding parts throughout the several views of the drawings.

2

Referring now more particularly to Fig. 1, numeral 1 indicates a pit in which are located a series of ram pots or cylinders 3, 5, 7, 9, and 11 in which are lift pistons or rams 13, 15, 17, 19, and 21 respectively. The cylinders support a platen 23. The platen 23 constitutes the moving bed of a press, further details of which are not shown, being old per se. The press may be of any variety but the invention is especially adaptable to very large sizes, such as for example presses carrying forming dies in which under substantial pressures large volumes of materials such as plywood, paper, plastics, et cetera may be molded with heat into complex forms such as airplane parts and the like.

In this large press art, one of the important problems to be solved is that of accurate, flexible and speedy control of the heavily weighted platen which under molding conditions is sometimes extensively loaded and sometimes locally loaded laterally from its geometric center. The platen is ordinarily retracted or opened a substantial distance in order to insert within the dies the material to be molded. It is then desired quickly to accomplish the first stage movement or so-called daylight closing, which means to close the press to a point at which the squeezing action just starts. At the end of this closing period no daylight may be seen between the contained material and certain parts of the dies. Means should be provided for effecting a temporary stop anywhere during daylight closing.

Next, there is to be an initial squeezing action upon the material with boosted pressure but which involves reactions which are below a final intensified pressure. A slacking off period may be desired during the boosted-pressure period in order to allow so-called breathing to take place; which means to allow escape of gasses generated by the heat in the compressed material. This may be referred to as the second stage of compression, either with or without slacking off. During this second stage the material is basically formed by the dies and a set takes place in it.

The third stage of compression involves closing the dies including an additional small distance under a predetermined maximum intensified pressure. This is in order finally to compress and compact the material from which the gas has by this time escaped.

Finally provision is to be made for relieving the pressure and completely opening the dies for removal of the material being treated.

A problem that often arises in connection with large presses is that the platens are usually quite extensive, and since it is difficult to make a large platen stiff enough without excessive weight, several rams such as 13, 15, 17, 19, and 21 are used. The resulting distribution of forces exerts a steadying action. Each ram applies a lifting force proportional to its area, assuming a given unit pressure of fluid used under all of them. The central ram 17 is the largest, being mainly depended upon to carry much of the load. The auxiliary rams 15 and 19 are preferably of the same size as shown and are located symmetrically on each side of the ram 17. At the ends are the pair of symmetrically arranged additional smaller rams 13 and 21 which have yet smaller areas. The purpose of the additional pairs of rams (13, 15), (19, 21) is to take care of overhung weight due to the cantilever character of the platen parts on each side of the center ram 17.

As will appear, certain of the rams less than all may also be used with pressure locally applied as required in order to meet any special localized excess-pressure conditions, for example, such as may be due to special local requirements of materials which are being molded in the dies. Or, it may be desired in the case of small work to use only a small non-central area of the platen.

Referring again to Fig. 1, cylinder 7 is provided with a liquid supply manifold 25. The cylinders 5 and 9 are provided with a branched liquid supply manifold 27. The cylinders 3 and 11 are provided with a branched liquid supply manifold 29.

The manifold 25 is supplied with liquid through four, diaphragm-controlled valves 31 parallel-connected to a branch 33 of a main supply manifold 35. The manifold 27 is supplied with liquid through three, diaphragm-controlled valves 37 parallel-connected from a branch 39 of said main supply manifold 35. The manifold 29 is supplied with liquid through a single diaphragm-controlled valve 41 from a branch 43 of said main supply manifold 35. The main supply manifold 35 connects with the bottom of a main liquid sump tank 47. The valves 31, 37 and 41 are all of known form, being all normally biased open by operating springs and pressed closed by pressure applied to their diaphragms. Each is of the two-way type.

Upon lowering the platen 23, it is intended that liquid be returned to the tank 47, and that the liquid shall approximately fill the tank up to a level such as shown for example at 49. Thus a small air space remains in the tank 47 which may be put under air pressure of, for example, 115 p. s. i. obtainable from a main air supply line 51. This supplies the initial daylight closing pressure for the pistons or rams.

The connection between the main air line 51 and the tank 47 is shown at 53 and includes a diaphragm-operated valve 55. Valve 55 is of the three-way type. The diaphragm component 57 of this valve is operated from a pilot air line 59 and opens the valve against a normally closing return spring when the pilot line 59 is under pressure. When the line 59 is not under pressure the valve spring returns, recloses the valve 55 and opens the tank to its exhaust port in which is a pressure release valve 65. In the connection from the air line 51 to the valve 55 is a hand valve 61. In the connection from the valve 55 to the tank 47 is another hand valve 63. When the valve 55 is open to line 53 its release passage to the valve 65 is closed. When valve 55 is closed it releases through the valve 65. The release valve 65 is of the loaded type which allows release of pressure down to a point above atmosphere, for example in the present system, 55 p. s. i. The purpose of this is to eliminate the necessity of building up pressure in the tank to 115 p. s. i. all the way from atmospheric pressure, each time that the platen is to be lifted, and also to act as a cushion for the descending platen, as will appear.

As above stated in connection with the tank 47, when the platen is down the sump tank 47 becomes almost filled with liquid. When the tank 47 is full to the level 49 it is intended that the entire system shall be full, with the platen 23 down.

It sometimes becomes necessary to drain part of the system in order to make repairs at various levels and for this purpose an auxiliary tank 67 is provided. This is connected with the main tank 47 through a hand valve connection 69. This auxiliary tank 67 has a volume equal to the volume of liquid which it is necessary to drain from the system in order to make the repairs down to slightly below the common level of the center lines of manifolds 25, 27, 29, 33, 35, 39 and 43. Tank 67 will take drainage from the system through the valve connection 69, provided hand valve 69 is open and also provided a valve 71 is opened in a standpipe 73. Pipe 73 is made high enough to provide a liquid head equal to that in the system as a whole under drainage conditions. If made transparent, the level of liquid in the draining system may be detected in this pipe 73, provided valve 71 is open.

Another purpose of the tank 67 is for filling purposes through a pipe 75 which has a filler plug 77. Filling operations will be described later. Pipe 75 has a branch connection 79 to tank 47 in which is a valve 81 and an opening plug 83.

The main tank 47 is provided with a safety pressure relief valve 85, set for example at 200 p. s. i. The tank 47 has a drain valve 87 as does also the tank 67, as shown at 89. The tank 67 has a valved connection 91 with the main air line 51. Valves 61, 63, 69, 71, 81, 87, 89 and 91 are all hand-operated shut-off valves.

Air pressure from the line 51 applied to the tank 47 through valve 55, as will appear, is adapted to squeeze fluid from the tank 47 into the manifold 35. If the valves 31, 37 and 41 are open, fluid will flow to the manifolds 25, 27 and 29 to lift the pistons 13, 15, 17, 19 and 21 at 115 p. s. i. unit pressure.

In order to supply this air line pressure to the tank 47 the valves 61 and 63 are manually opened. Opening of the diaphragm valve 55 is accomplished from the pilot air line 59 which is connected to a hand-controlled four-way distributor valve 93. This valve 93 has a vent 95 and a connection 97 supplying each of the diaphragms of valves 31. Through branches 99, 101 and 103 from connection 97 it also supplies the diaphragms of the valves 37 and 41. Thus all of the valves 31, 37 and 41 will at the same time be opened at will by admitting pressure from valve 93. This is done by moving the handle 60 of valve 93 to the up "B" position (see Fig. 2).

The four-way valve 93 is supplied with air at 115 p. s. i. from the main air line 51 through a hand-operated main air valve 105 and an automatic air pressure regulator valve 107 which is in a pipe 109. The regulator valve 107 is set to some reduced pressure below the line pressure of 115 p. s. i., for example 35 p. s. i. This reduced pressure is for diaphragm control purposes of the various diaphragm valves.

When the handle 60 of valve 93 is placed in "down" position A (Fig. 1), air flows from the main line 51 through open shutoff valve 105, regulator valve 107, four-way valve 93, pilot line 59 and to the diaphragm 57 of the diaphragm valve 55. Normally closed valve 55 opens to admit air under line pressure to the tank 47. Admission occurs over the connection 53, provided the hand valves 61 and 63 are at this time open, which normally they are. At the same time the four-way valve 93 releases air pressure to exhaust 95 from the lines 103, 101, 99 and 97, thus allowing the diaphragm valves 31, 37 and 41 to take up their normally open positions. This results in the air pressure in the tank 47 squeezing liquid out over the manifold 35, branches 33, 39, 43 and manifolds 25, 27, and 29 to the cylinders 3, 5, 7, 9, and 11. This effects the so-called daylight closing or lifting of platen 23 at a rapid rate because of the large volumetric displacement of liquid which may in this way be effected by the line air pressure in the tank 47. This corresponds to event No. 2 in Fig. 4.

When the daylight closing action ends, which is when the dies in the press close on the materials between them, reaction pressure builds up on the pistons until the hydraulic pressure created by the air line pressure is balanced by the platen load, whereupon lifting automatically stops (events Nos. 2 and 4; Fig. 4).

The above operation assumes no manually introduced stopping action corresponding to event No. 3 in Fig. 4. To interrupt and stop daylight closing anywhere, the handle of valve 93 is raised to the Fig. 2 position. Pressure through valve 93 from line 51, valve 105, regulator 107 and valve pipe 142 then passes to the diaphragms of valves 31, 37 and 41 and shuts these off to prevent sinking of the platen. At the same time relief of pressure occurs from the pilot line 59, thus allowing valve 55 to close. Whenever it is wished to reinstate the daylight closing operation, the handle of valve 93 is again set into the down position of Fig. 1. Event No. 3 may be interpolated anywhere in the daylight complete closing operation consisting of events Nos. 2 and 3 (Fig. 4).

If desired after stopping the lifting of the platen, it may be retracted by setting the handle 60 to the neutral "C" position (Fig. 3) in which event lines 97, 99, 101 and 103 are released to exhaust 95, as also is pilot line 59. Thus valve 55 closes and its exhaust port is open to valve 65. Valves 31, 37 and 41 open and liquid drains back to tank 47 as the platen descends. Drainage is at the 55 p. s. i. back pressure set by relief valve 65. This cushions the platen descent.

Next, assuming completion of daylight closing to an automatic stop or stall condition, in order to develop a higher working or boosted pressure for deforming or squeezing the materials between the dies, the operator moves the handle of the four-way valve 93 into its "up" position shown by the line B in Fig. 2, which again has the effect of placing the pipes 109 and 142 in communication with the pipes 97, 99, 101 and 103, thus causing air pressure (35 p. s. i.) from the pressure reducer 107 to close the valves 31, 37 and 41, thus trapping liquid (under 115 p. s. i. pressure) between the valves 31, 37, 41 and the pistons 13, 15, 17, 19 and 21. At the same time valve 93 releases pressure from the pilot line 59 to the exhaust port 95. This unloads the diaphragm 57 of the diaphragm valve 55 which takes up its normally closed position wherein pressure is released from the tank 47 through the pressure relief valve 65 down to the stated 55 p. s. i., thus making the tank ready for subsequent reception on the next working cycle of fluid from the system.

Since it is desired to compress the material between the dies, additional or increased pressure must be brought into play, which is greater than the line pressure of 115 p. s. i. This is done by means of a number of air-operated hydraulic pump units 111 and an auxiliary intensifier air-operated hydraulic pump unit 113. These pump units are all of the general type shown in U. S. Patents 2,215,852 dated September 24, 1940, and 2,269,423 dated January 13, 1942. Further details of the pumps are unnecessary in view of said patents, except to state that each engine has a reciprocating air engine part 115 (in the case of units 111) and 117 (in the case of unit 113). Each unit also has a direct-connected hydraulic pump part 119 (in the case of the units 111) and 121 (in the case of unit 113). The pump parts are directly reciprocated by the engine parts respectively. They have inlet ports 120 connected to the manifold 35, as shown. All of the units 111 and 113 are preferably alike, thus making easy the supply of parts therefor. Desired differences in outlet pressures obtained from the pump parts 119 (of units 111) as compared with the pump part 121 (of unit 113) is brought about by differences in air pressures supplied to the air engines 115 (of units 111) as compared to the air pressure supplied to engine 117 (of unit 113).

All of the engines 115 (of units 111) are supplied with air in parallel by a common air manifold 123. Manifold 123 receives air from a supply pipe 125, the latter being connected with a pressure reducing valve 127. This excludes unit 113. The reducing valve 127 is of the manually regulatable type and is adjusted so that with the piston-plunger ratios used in units 111, the liquid pressure from the pumps 119 (not 121) is of the order of 1400 p. s. i. Since this is a boosted pressure, compared to that already under the platen pistons, the units 111 (not 113) will be called booster pressure units. They act together to provide a common boosted-pressure supply of liquid.

The engine 117 of unit 113 receives air over a separate supply pipe 129 by way of a manually adjustable regulator valve 131. Regulator 131 is set for higher outlet pressure than regulator 127. Thus, in view of the piston-plunger ratio of unit 113 the outlet pressure from pump 121 is of the order of 1500 p. s. i. Since this is an intensification over the boosted pressure from booster units 111, unit 113 will be referred to as an intensifier pressure unit.

The inlets of the regulator valves 127 and 131 are tied together by a supply header 133 which is supplied with air over air line 135. Line 135 leads back to, and is controlled by hand valve 105. In the line 135 is a normally spring-closed diaphragm-controlled valve 137. The diaphragm 139 of valve 137 is actuated from air line 141 in which is a three-way solenoid air valve 143. This valve 143 is electrically controlled from a manual switch 145 located near the valve 93. The pipe 141 connects with the line 142 at a point beyond the regulator valve 107 so that the diaphragm element 139 receives only regulated air pressure through valve 143 (35 p. s. i.).

The group of six units 111 may be fed with air in either of two ways. In both ways they receive air from the line 135 when valve 137 is opened by operation of switch 145. The first way involves unregulated air pressure at 115 p. s. i.

from line 135 passing directly to the supply line 125 of the six units 111. This is done through a by-pass loop 147 around regulator 127. In this loop 147 is a two-way solenoid air valve 149 which is under automatic control of a spring-opened diaphragm-operated switch 151. The diaphragm 153 of the switch 151 is connected through pipe 155 with a common liquid outlet header 157 of the group of pumps 119 of units 111. Switch 151 is set to close at 1390 p. s. i.

The second way in which these units 111 may receive air from line 135 is through regulator 127 and then through line 125 to the common air manifold 123.

Unit 113 receives air from line 135 only through regulator 131 which is never by-passed by unregulated air.

The common liquid outlet 157 of the six pumps 119 is connected through line 159 to a common header 161 which has three leads 163 to the manifolds 25, 27, and 29 respectively. Each lead 163 includes a manual cutoff valve 165 and a check valve 167 allowing no return flow from the manifolds 25, 27, 29, even with valves 165 open. Outlet header 157 also has a pressure relief connection 158 with the manifold 35 which acts as a safety release should excessive pressure accidentally build up in the pump outlets.

Pump 121 has a separate liquid outlet 169 leading to a header 171 which has three leads 173 respectively to said manifolds 25, 27 and 29. In each of these leads 173 is a simple cutoff valve 175. The outlet 169 has a pressure relief valve connection 170 with the manifold 35 which acts as a safety release should excessive pressure accidentally build up in outlet 169.

All of the seven pumps 119 and 121 are supplied with fluid by the manifold 35 to which they are connected at 120.

From the above it will be apparent that the handle of valve 93 may be placed at the upper (Fig. 2) "B" position (event No. 5; Fig. 4), resulting in the valves 31, 37 and 41 being closed. The valve 55 returns to relief position (as above shown). Then if the switch 145 is manually closed as intended, normally closed valve 137 will open because the opening of solenoid valve 143 will admit air to diaphragm 139. In other words closing of switch 145 opens valve 137. Conversely, opening switch 145 closes valve 137. It will be noted also that in the absence of 1390 pounds pressure on diaphragm 153 of diaphragm switch 151 that the solenoid by-pass valve 149 is open. Thus, line pressure from line 135 by-passes the regulator 127. Hence line 125 receives air at line pressure, instead of at regulated pressure, which causes the pumps 111 to operate at maximum speed and volume output, thus pumping a large volume through the manifolds 25, 27 and 29 and under pistons 13, 15, 17, 19, 21 and considerably reducing the time for moving the platen to squeeze the dies under boosted pressure. It will also be noted that during this period unit 113 is also receiving air through regulator 131, thus causing its pump 121 to add its smaller volume of flow to manifolds 25, 27 and 29 through lines 169, 171 and 173, thus further shortening the initial squeezing time. In other words this pump is not idle while awaiting its chief function, to be described.

As the dies squeeze their contents, reactive back-pressure builds up in manifold 157. At the predetermined back-pressure of 1390 pounds the diaphragm 153 of the switch 151 is affected through line 155 to close switch 151. The normally open solenoid valve 149 then closes, which causes the line 125 to receive air only through the regulator 127. Thus the final balanced pressure available in the manifolds 25, 27 and 29 from units 111 is controlled from regulator 127.

It is especially to be noted that the by-pass solenoid valve 149 eliminates bottle-necking of air volume through the regulator 127 throughout most of the squeezing action by the units 111, assisted by unit 113. Nevertheless control of the maximum that the booster pressure can reach is accomplished.

The purpose of the independent intensifier unit 113 is to produce a pressure which is higher than that produced by the pumps 111. This is accomplished by the adjustment of the separate regulator 131 so that the pressure of pump 121 exceeds that of pumps 119, say 100 p. s. i., or so. Thus when the booster units 111 reach a stall condition, due to reaction from the platen equalling the force available from the units 111, the intensifier unit 113 will continue to operate and build up intensified pressure, though with less volumetric displacement (event No. 8; Fig. 4). The low volumetric displacement from unit 113 alone at the higher intensified pressure is of no disadvantage because when the material between the dies is at its ultimate point of compression not much further displacement is required.

Because the pressure from the unit 113 is higher than that from the units 111 (1500 p. s. i. or so), the check valves 167 are employed which prevent this higher pressure from unit 113 from backing up against the units 111.

In order to stop the platen under boosted-pressure conditions caused by units 111 (event 6; Fig. 4) the handle of the valve 93 is maintained at its up position B (Fig. 2), the switch 145 is opened, valve 143 closes and releases, and the valve 137 closes to prevent the high pressure from line 135 from feeding the pumps. Hence lifting action ceases but a holding operation is maintained under pressure.

If at this time it is desired temporarily to open the dies so as to permit so-called "breathing" of the material (event No. 7; Fig. 4) the operator shifts the handle of the valve 93 to neutral position C which releases pressure from the diaphragms of the valves 31, 37, and 41, thus permitting them to open. This also exhausts pilot line 59 which closes valve 55 permitting the tank 47 to exhaust through valve 65. This allows liquid to run through the manifold 35 and return to the tank 47 due to the weight of the platen and the parts supported thereon. A cushion effect is produced by the 55 pounds of residual pressure maintained in the tank 47 by the action of the pressure relief valve 65.

In order to completely lower the platen to the idle position shown (event No. 1; Fig. 4) the handle of valve 93 is set to the neutral position C. The switch 145 is reopened causing valves 143 and 137 to close (valve 143 exhausting). This, as in the case of event No. 7 allows the platen to descend.

A recapitulation in condensed form of the various operations is shown in Fig. 4. In this recapitulation events Nos. 3 and 6 are indicated as stop operations to show how dwell periods may be introduced at any stage. Event No. 7 is a lowering operation which, as already described may be made to occur also after event No. 3. It will of course also be appreciated that stop events and lowering events could be inserted between other of the operations as desired. The stop and lowering operations shown are typical of expected practice. Events Nos. 5A and 8A require no manual operation and occur automatically at the ends of events Nos. 5 and 8 respectively.

It will be understood that the switch 145 is shown in simplest diagrammatic form. Also that a momentary contact switch circuit may be used between a push-button type of switch 145 and solenoid valve 143 so that successive pushes on the push-button switch will cause successive open and closed conditions of valve 137, each condition being maintained until changed by a succeeding push-button operation. All-electrical or all-manual operation of valve 137 may also be employed.

If during any stop and holding operation leakage occurs from the cylinders 3, 5, 7, 9 or 11, or any of their supply pipes, this will be compensated by automatic starting of the unit 113 and perhaps also units 111, depending upon the rate of leakage. This is due to the unbalanced pressure which occurs which will cause the said units to start from their stalled conditions. Since regulator 131 is set 100 pounds higher than regulator 127, it will start unit 113 first. If this unit cannot make up the leakage, regulator 127 brings units 111 into action. Since switch 153 is set at 10 pounds lower than regulator 127, the by-pass valve will never open for leakage make-up. This is as desired because it avoids variations of pressure applications for mere leakage compensation.

Any one or more of the valves 175 or 165 may be closed so as to localize pressures as desired from the manifolds 25, 27, and 29 on the piston 17, or 15, 19, or 13, 21. Thus bending of the platen as a cantilever may be prevented by suitable control of these valves 175 and 165. The platen 23 cannot be cocked out of line because the two end cylinders 3 and 11 are connected in parallel, as are also the cylinders 5 and 9.

It will be understood that suitable gages for indicating conditions in various parts of the circuit are used as needed; also suitable relief cocks and the like. These have not been shown in the drawings in order to simplify the description and because their use in any event is common as needed.

It will also be understood that the values of pressure given are only exemplary and that others may be used for other conditions. It will also be noted that the various valves are shown diagrammatically in the drawings, for example valve 93 for simplicity is shown as being of the rotary type, whereas it may be of the translating type. As above remarked, other equivalents may also be used for controlling valve 137. This is also true of valve 149.

Ordinarily, the valves 93, switch 145, regulators 127, 131, gages, etc. will be placed upon a panel near the platen 93 so that the operator may watch the work and system conditions at the same time, so as to exert appropriate control. This possibility is due to the remote controls used.

The most likely repairs required are easy to make. To remove a valve from a line, the valve 93 is placed in neutral position C and tank valves 69 and 71 are opened which will allow drainage from the piping system through the large hydraulic tank 47 into the small tank 67, enough to drain to a level below the points where the repair has become necesary, that is below the center lines of pipes 25, 27 and 29. The tanks are below this level. This drained liquid may later be forced back into tank 47 without the necessity for a refill.

Drainage of the cylinders 3, 5, 7, 9 and 11, if this becomes necessary (which is not often) needs to be done through drain cocks (not shown) in the piping below them. Such drainage is not back to the tanks and of course then will require a refilling of the system.

Filling of the system is accomplished by opening suitable vents (not shown) at the tops of the cylinders 3, 5, 7, 9 and 11. Valves 63, 81, 91 and 105 are closed. Valves 69 and 71 are opened. The relief valve 85 is removed and the plugs 77 and 83 are opened. The sump tanks 67 and 47 are then filled at 77 with a suitable hydraulic oil. Plugs 77 and 83 are closed. Valves 71 and 69 are then closed and valve 81 is opened. The valve 91 is opened admitting air at 115 p. s. i. to the small tank 67, thus forcing hydraulic fluid into the large tank and into the piping system until liquid is expelled freely through the vents in the cylinders 3, 5, 7, 9 and 11. Finally valves 81 and 91 are closed while valves 71 and 63 are opened. The handle of the four-way valve 93 is then placed in neutral position C. The main air valve 105 and valve 61 are then opened and the system is ready for operation.

Visual inspection may be made by means of a sight level 50 mounted on the end of the tank 47. This inspection for level should be made when the platens are in down position. Make-up oil may be added by allowing valve 93 to remain in neutral position C, removing plug 77 and adding oil as required. After make-up plug 77 is replaced, valve 71 is then opened while valves 81 and 91 are closed. After the right amount of oil has been transferred to the large tank 47, according to the sight gage 50, valves 81 and 91 are reclosed and valve 71 is reopened.

It is clear that by means of the above system localized pressure may be applied to the central piston 17, or to either or both tandem piston sets 15, 19 and 13, 21. This is done by control of the valves 165, 175 and compensates for platen unevenness caused by overhang. If the refinement is ever found to be desirable, the members of the tandem pairs may be localized by feeding the branches 27A and 29A of manifolds 27 and 29 respectively by means of split feeds from lines 161 and 171, instead of the respective single feeds now shown from these lines to the trunk manifolds 29 and 27. Each split feed would carry the same set of valves as now shown at 175 in each line 173 and at 165, 167 in each line 163. Hence any branch could be individually blocked. This would permit of compensation for eccentric platen loading.

In view of the above, it will be seen that the several objects of the invention are achieved and other advantageous results attained.

As many changes could be made in the above constructions without departing from the scope of the invention, it is intended that all matter contained in the above description or shown in the acompanying drawings shall be interpreted as illustrative and not in a limiting sense.

We claim:
1. Hydro-pneumatic lifting apparatus comprising a platen, expansive chamber means for lifting the platen, a sump tank, a liquid connection between the sump tank and the expansive chamber means, a normally open air-operated valve in said connection, an air-operated liquid pump arranged to pump liquid from one point of the connection to another point therein and by-passing said valve, a normally closed air-operated valve for admitting air pressure to said tank, a distributor, an air supply line, said distributor being connected between said air supply line, the air-operated valve for the tank and said air-operated valve in said liquid connection in such a way that when the air-operated valve to the sump tank is open said liquid valve is open, and additional air line control means for controllably supplying air to said air-operated pump to cause liquid to by-pass the liquid valve when the latter is closed, a pressure reducing regulator in the air line to the pump, a by-pass connection around said regulator, and control means in said by-pass connection responsive to pressure from said pump adapted to close said by-pass at a predetermined pump outlet pressure, said by-pass control means being otherwise normally open.

2. In apparatus of the class described, a movable platen, a plurality of separately actuated expansible chamber means for moving the platen, separate liquid supply means for said chamber means, a sump tank having a common connection with said separate liquid supply means, a separate and normally open air-actuated valve in each of said liquid supply means, separate air-actuated liquid pumps having a common connection with the sump tank and independent outlet connections with the respective liquid supply means and respectively by-passing said valves, an air valve associated with the pressure tank for controlling application of pressure therein from an air supply line, air supply means for said air-operated pumps, said air supply means being branched to the separate pumps but having a common control means, separate regulators in the branches one of which is normally by-passed by an open valve in a by-pass, the outlet of the pump which is supplied by the branch having the by-pass including a liquid check valve preventing return flow to the pump, common control means for simultaneously opening the sump tank valve and the valves in said liquid connections, and automatic control means responsive to the outlet liquid pressure from the pump with which is associated the outlet check valve for closing said normally open by-pass at a predetermined liquid pressure from the last-named pump.

3. In apparatus of the class described, a movable platen, a sump tank carrying liquid, an outlet manifold from said tank, a main expansible chamber means for moving the platen, an individual liquid connection therefrom to said manifold, separate expansible chamber means connected to the platen, an individual liquid connection between said separate means and the manifold, air-operated control means in the respective connections, a plurality of air-operated booster pumps adapted to pump from the manifold and by means of a common branched by-pass around said control means supplying liquid to said individual connections, the respective branches each including a check valve, an intensifier pump adapted to pump from said manifold and having a branched by-pass connection around said control means and through its branches also individually supplying said connections, a valve controlling the supply of compressed air to said tank above the liquid therein, and common control means for the tank valve and said control means in the connections whereby they may simultaneously be opened and closed, air supply means having separate branches for the booster pumps and the intensifier pump, pressure regulators in said branches, a normally open by-pass around the regulator supplying the booster pumps, means responsive to outlet pressure from the booster pumps for closing said by-pass at predetermined boosted pressure, and means for controlling all of the air supply to all of the pumps.

4. In apparatus of the class described, a movable platen, a plurality of expansible chamber means for moving the platen, a sump tank for liquid and air under pressure, an outlet liquid manifold from said tank, individual liquid connections between said manifold and respective expansible chamber means, a normally open valve in each of the respective connections, a normally closed valve controlling supply of air pressure to the sump tank, air-operated booster pump means for pumping fluid from the manifold through a line which branches to said respective connections around said valves in the connections, each branch including a control valve and a check valve, additional intensifier air-operated pump means connected to said manifold, a liquid line from said intensifier pump means and having individual branches to said connections respectively including control valves and connected around said valves in the connections, common control means for simultaneously opening the air valve on the tank and said valves in the connection and for closing both, the volume of flow from said booster pump means being greater than that from the intensifier pump means, air supply means having separate branches for the booster pumps and the intensifier pump, pressure regulators in said branches, a normally open by-pass around the regulator supplying the booster pumps, and means responsive to pressure from the booster pumps for closing said by-pass at predetermined boosted pressure.

5. In apparatus of the class described, a movable platen, a plurality of expansible chamber means for moving the platen, a sump tank for liquid and air under pressure, an outlet liquid manifold from said tank, individual liquid connections between said manifold and respective expansible chamber means, normally open air-operated valves in the respective connections, a normally closed valve controlling supply of air pressure to the sump tank, air-operated booster pump means for pumping fluid from the manifold through a line which branches to said respective connections, each branch including a control valve and a check valve, additional intensifier air-operated pump means connected to said manifold, a liquid line from said intensifier pump means and having individual branches with said connections each respectively including a control valve, each of said respective lines from the booster pump means and from the intensifier pump means by-passing the respective valves in said connections, common control means for simultaneously opening the tank air valve and said valves in the connections and for closing both, the volume of flow from said booster pump means being greater than that from the intensifier pump means, a branched air supply having separate branches to the booster pump means and the intensifier pump means and individual regulators in said branches, a normally open by-pass around the regulator in the branch feeding the booster pump means, and means responsive to pressure in the outlet of the booster pump means adapted to close said by-pass at a predetermined boosted pressure.

6. In apparatus of the class described, a movable platen, expansible chamber means for moving the platen, a sump tank, liquid connecting means between said tank and the expansible chamber means, air-operated first and second pump means for pumping fluid from the tank to the expansible chamber means, a branched air supply having separate branches to the first and second pump means respectively, individual pressure regulators respectively in said branches, a normally open by-pass around the regulator in the branch feeding to the first pump means, and means responsive to the outlet pressure of the first pump means adapted at a predetermined pressure to close said by-pass whereby the first pump means continues to be fed with air which then passes through its respective regulator.

7. A hydro-pneumatic compression apparatus comprising a platen, expansive chamber means for moving the platen, a compressed-air sump tank for liquid, a first control valve for controlling air pressure in the sump tank, a liquid connection between the sump tank and the expansive chamber means, a second control valve in said connection, means for contemporaneously opening said first and second control valves, a liquid booster pump arranged to by-pass said second control valve, a liquid intensifier pump arranged also to by-pass said second control valve, a check valve in the by-pass connection for the booster pump arranged to prevent flow from the intensifier pump to the booster pump, independent control means for simultaneously energizing or deenergizing both of the pumps, normally operative regulators for controlling the respective pressures to be delivered by the booster and intensifier pumps, by-pass means around the regulator of the booster pump, which means is normally open until a predetermined value of booster pump delivery pressure is reached, and means for closing said by-pass means in response to a predetermined outlet pressure of the booster pump.

8. Hydro-pneumatic compression apparatus comprising a platen, expansive chamber means for moving the platen, a sump tank, an air-operated air supply and release control valve for the sump tank, a liquid connection between the sump tank and the expansive chamber means, an air-operated liquid control valve in said connection, an air-operated liquid booster pump arranged to by-pass said liquid control valve, an air-operated intensifier also arranged to by-pass said liquid control valve, a check valve in the by-pass connection of the booster pump adapted to prevent movement of liquid from the intensifier pump to the booster pump, an air supply line, a first remote control means connecting said air supply line and said air-operated control valves simultaneously to open them so as to admit air pressure to the sump tank and enforce liquid flow to the expansible chamber means or to move the tank-air valve to release position while closing said liquid control valve to prevent flow from the expansible chamber means to the sump tank, and to open the liquid control valve while holding the sump tank valve at release to allow return flow to the sump tank, branched connections from said air supply line respectively to said pumps, independent regulator means in said branched connections respectively, a normally open by-pass around the regulator in the branched connection to the booster pump, and means responsive to a predetermined pressure in the outlet of the booster pump for blocking said by-pass and forcing all air to the booster pump to pass through its respective regulator, said last-named regulator being set to regulate to a pressure lower than that of the regulator which supplies the intensifier pump.

SHERMAN H. DORSEY.
AUGUST D. REISERT.
ALEXANDER P. FOX.
CARL H. MUELLER.

REFERENCES CITED

The following references are of record in the file of this patent:

UNITED STATES PATENTS

| Number | Name | Date |
| --- | --- | --- |
| 222,554 | Watson | Dec. 9, 1879 |
| 958,853 | Bulley | May 24, 1910 |
| 1,290,203 | Houk | Jan. 7, 1919 |
| 1,382,315 | Philippi | June 21, 1921 |
| 1,903,887 | Widener | Apr. 18, 1933 |
| 1,972,812 | Woolley | Sept. 4, 1934 |
| 2,055,831 | Wilhelm | Sept. 29, 1936 |
| 2,165,095 | Frechette | July 4, 1939 |
| 2,219,709 | Lee | Oct. 29, 1940 |
| 2,336,808 | Simon | Dec. 14, 1943 |
| 2,339,086 | Makaroff | Jan. 11, 1944 |
| 2,371,450 | Langdon | Mar. 13, 1945 |
| 2,374,737 | Desoutter | May 1, 1945 |